United States Patent [19]

Hyakutake

[11] Patent Number: 5,467,007
[45] Date of Patent: Nov. 14, 1995

[54] CHARGING APPARATUS

[75] Inventor: Kiyoshi Hyakutake, Fukuoka, Japan

[73] Assignee: Matsushita Electric Industrial Co., Ltd., Osaka, Japan

[21] Appl. No.: 38,830

[22] Filed: Mar. 29, 1993

[30] Foreign Application Priority Data

Sep. 16, 1992 [JP] Japan ................... 4-246218

[51] Int. Cl.$^6$ ................... H02J 7/10; H02J 7/02
[52] U.S. Cl. ................... 320/22; 320/31; 320/24; 455/89
[58] Field of Search ................... 320/22, 39, 23, 320/24, 31, 37; 455/89, 90

[56] References Cited

U.S. PATENT DOCUMENTS

| 4,740,754 | 4/1988 | Finger | 324/428 |
|-----------|--------|--------|---------|
| 4,885,523 | 12/1989 | Koenck | 320/21 |
| 4,942,352 | 7/1990 | Sano | 320/2 |
| 5,266,880 | 11/1993 | Newland | 320/14 |

FOREIGN PATENT DOCUMENTS 62-260533  11/1987  Japan .................. H02J 7/34

Primary Examiner—Peter S. Wong
Assistant Examiner—Robert Nappi
Attorney, Agent, or Firm—Stevens, Davis, Miller & Mosher

[57] ABSTRACT

A charging apparatus capable of charging a secondary battery so that a utilization time thereof is not shortened is disclosed. When a microcomputer 63 judges that a voltage of the secondary battery has not reached a fully charged voltage, the microcomputer sets a predetermined value to a timer circuit 65 and then turns on a drive portion 57 to flow current through a resistor 59 so that the secondary battery is charged by a normal charging current. At the same time, the timer circuit 65 is started. When the timer circuit 65 reaches the set value, the microcomputer 63 turns off the drive portion 57 and turns on a drive portion 60 to thereby flow current through a resistor 62 so that the secondary battery is charged by a trickle charging current.

6 Claims, 4 Drawing Sheets

CHARGING APPARATUS

BACKGROUND OF THE INVENTION

1. Field of the Invention

The present invention relates to a charging apparatus for use in a cordless telephone system.

2. Description of the Prior Art

Heretofore, a cordless sub-telephone of a cordless telephone system is operated by a chargeable battery, which is charged by a charging apparatus or charger (provided in a base station telephone, for example).

Referring now to the drawings, a conventional charging apparatus is described with reference to a cordless telephone system as an example. FIG. 4 illustrates a charging unit of the base station telephone. In FIG. 4, numeral 1 denotes an AC adapter including an AC-to-DC converting circuit and numeral 2 denotes a voltage stabilizing circuit or a constant-voltage circuit connected to the AC adapter to which a control terminal 3 is connected. The constant-voltage circuit 2 can switch a charging current to 0.5, 0.1 and 0.03 of a battery capacity. These currents are hereinafter named a rapidly charging current, a normally charging current and a trickle charging current, respectively. Further, numeral 4 denotes charging terminals connected to an output of the constant-voltage circuit 2.

FIG. 5 illustrates a charging unit of a cordless sub-telephone of the cordless telephone system. In FIG. 5, numeral 5 denotes a secondary battery, 6 charging terminals, 7 a reverse current preventing diode, 8 an input circuit for detecting a voltage of the battery, 9 a voltage reduction detecting circuit, and 10 a microcomputer for producing a control signal to a control terminal 13 in response to an output of the voltage reduction detecting circuit 9. When the microcomputer judges a reduction in the voltage of the secondary battery in accordance with the output of the voltage reduction detecting circuit 9, the microcomputer 10 drives a drive transistor 11 to turn on and off a light emitting diode 12.

Operation of the cordless telephone system configured above is now described.

In the cordless sub-telephone, a voltage of the secondary battery 5 is divided by the input circuit 8 and is supplied to the voltage reduction detecting circuit 9. At this time, when the microcomputer 10 judges from the output of the voltage reduction detecting circuit 9 that a terminal voltage of the secondary battery 5 is lower than a reference voltage, the microcomputer drives the drive transistor 11 to turn on and off the emitting diode 12. At this time, when the cordless sub-telephone is placed on the base station telephone, the control terminal 3 and the charging terminals 4 of the base station telephone come into contact with the control terminal 13 and the charging terminals 6 of the cordless sub-telephone, respectively. Thus, the microcomputer 10 produces a signal indicative of a rapid charge to the connection terminal 13.

The constant-voltage circuit 2 which has received the signal supplies the rapidly charging current to the secondary battery for a fixed time and then supplies the normally charging current to the secondary battery 5. Thereafter, when the terminal voltage of the secondary battery 5 reaches a predetermined value or more, the constant-voltage circuit 2 supplies the trickle charging current to the secondary battery 5 to continues to supplement the naturally discharged component of the secondary battery 5.

When the cordless sub-telephone is placed on the base station telephone when the voltage of the secondary battery 5 is lower than the reference voltage, the micro-computer 10 produces a signal to the connection terminal 13 to flow the normally charging current. The constant-voltage circuit 2 supplies the normally charging current to the secondary battery 5 in accordance with the amount consumed and then supplies the trickle charging current to the battery.

Normally, the secondary battery 5 uses a nickel-cadmium battery, which has a small internal resistance and small variation in voltage even if the residual battery capacity is very small. Further, if a plurality of battery cells are used, voltage values of the battery cells which have been completely charged are influenced by scattered characteristics of each of the battery cells. Accordingly, a battery pack composed of a plurality of battery cells connected in series to each other has a different voltage value for each battery pack used when the battery pack has been charged completely and it is difficult to judge whether the battery pack has been charged completely or not. Thus, when the cordless sub-telephone is returned to the base station telephone to charge the battery after the cordless sub-station has been utilized for a short time, it is judged that a voltage of the battery reaches a value obtained when the battery has been charged completely although the capacity of the secondary battery 5 is reduced slightly, so that the secondary battery 5 is supplied with the trickle charging current from the beginning and the secondary battery 5 is not completely recharged to the fully charged state.

SUMMARY OF THE INVENTION

It is an object of the present invention to provide a charging apparatus capable of charging a secondary battery so that a utilization time of the secondary battery is not shortened even if the secondary battery is utilized repeatedly for a short time.

The charging apparatus of the present invention comprises a charging unit capable of switching a charging mode between a normally charging mode in which a current flows to increase a charged quantity of a battery and a trickle charging mode in which a current flows to an extent that the charged quantity of the battery is maintained, a calculation portion for calculating a residual quantity of the battery, and a control unit for controlling the charging portion to switch the charging mode to the normally charging mode for a predetermined time and subsequently switch to the trickle charging mode when it is judged from an output of the calculation portion that the battery is charged fully. With the above configuration, according to the present invention, even when the secondary battery is used for a short time and is re-connected to the charging apparatus, the secondary battery can be charged fully.

DESCRIPTION OF THE PREFERRED EMBODIMENT

An embodiment of the present invention is now described with reference to the accompanying drawings.

Figure 1:
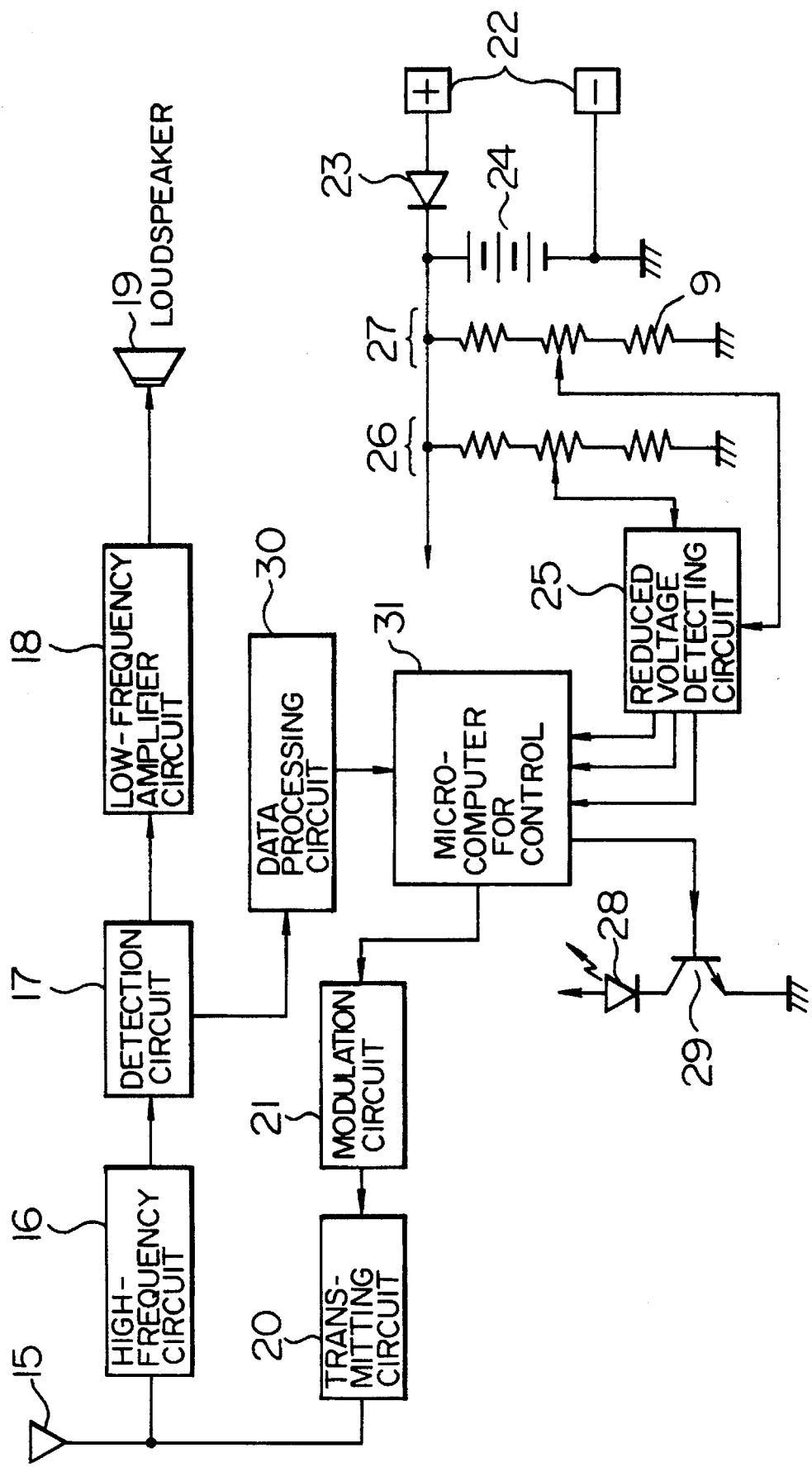
FIG. 1 is a block diagram schematically illustrating a circuit configuration of a cordless sub-telephone of a cordless telephone system including a secondary battery charged by a charging apparatus according to an embodiment of the present invention.

FIG. 1 is a block diagram schematically illustrating a circuit configuration of a cordless sub-telephone of a cordless telephone system in an embodiment of the present invention. In FIG. 1, numeral 15 denotes an antenna, 16 a high-frequency circuit, 17 a detection circuit for detecting an output of the high-frequency circuit 16, 18 a low-frequency amplifier circuit for amplifying an output of the detection circuit 17, 19 a loudspeaker connected to the low-frequency amplifier circuit 18, 20 a transmitting circuit, and 21 a modulation circuit. Numeral 22 denotes charging terminals, 23 a reverse current preventing diode, 24 a secondary battery, and 25 a reduced voltage detecting circuit connected through voltage dividing circuits 26 and 27 to the secondary battery 24. Numeral 28 denotes a light emitting diode and 29 a drive unit of the light emitting diode 28. Numeral 30 denotes a data processing circuit for converting the output of the detection circuit 17 into a data series, and 31 a microcomputer for producing an output to the modulation circuit 21 in response to an output of the reduced voltage detecting circuit 25 and for controlling the drive circuit 29.

Figure 2:
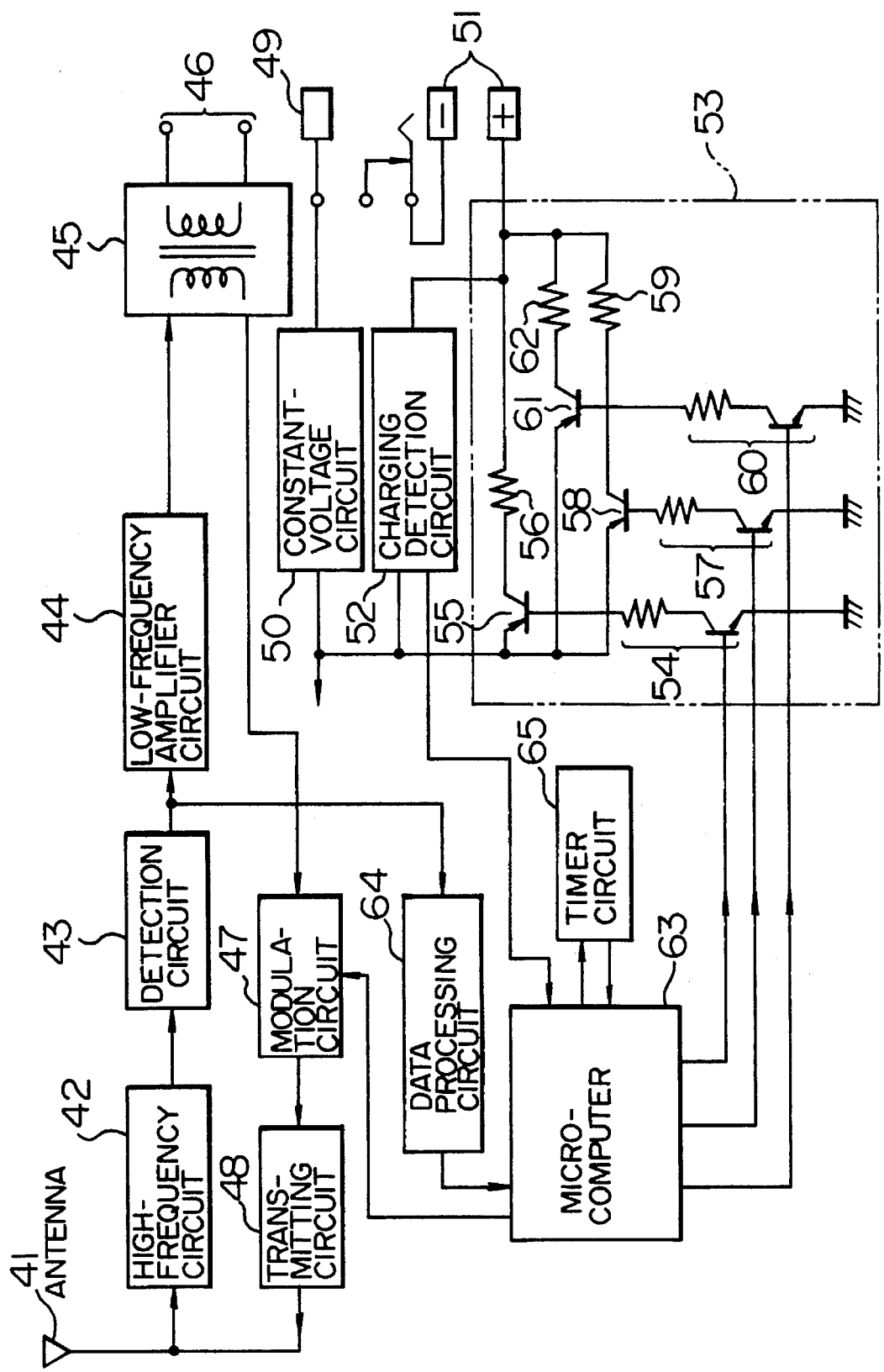
FIG. 2 is a block diagram schematically illustrating a circuit configuration of a base station telephone of a cordless telephone system including a charging apparatus in the embodiment.

FIG. 2 is a block diagram schematically illustrating a circuit configuration of a base station telephone of the cordless telephone system. In FIG. 2, numeral 41 denotes an antenna, 42 a high-frequency circuit connected to the antenna 41, 43 a detection circuit for detecting an output of the high-frequency circuit 42, 44 a low-frequency amplifier circuit for amplifying an output of the detection circuit 43, 45 a transformer connected to central telephone lines, and 46 central telephone lines. Numeral 47 denotes a modulation circuit for modulating a signal from the central telephone lines 46, 48 a transmitting circuit, 49 an input terminal for an AC adapter, 50 a constant-voltage circuit connected to the input terminal 49, 51 charging terminals, 52 a charging detection circuit for detecting a charged state of the secondary battery 24 in the cordless sub-telephone upon charging, 53 a current switching circuit for switching a charging current and which includes charging current limiting resistors 56, 59 and 62, transistors 55, 58 and 61 for changing over the resistors 56, 59 and 62, and drive portions 54, 57 and 60 for driving the transistors 55, 58 and 61. Resistance values R1, R2 and R3 of the resistors 56, 59 and 62, respectively, have a relation of R3>R2>R1. Further, numeral 63 denotes a microcomputer for controlling charging operation, 64 a data processing circuit for converting the output of the detection circuit 43 into a data series, and 65 a timer circuit to which a count can be set by the microcomputer 63.

Operation of the cordless telephone system configured above is now described. First of all, operation of the cordless sub-telephone is described. A terminal voltage of the secondary battery 24 is detected by the reduced voltage detecting circuit 25 and is stored as voltage data in the microcomputer 31. When the cordless sub-telephone is placed on the base station telephone so that the terminals 22 come into contact with the terminals 51 of the base station telephone, the voltage data of the secondary battery 24 is supplied from the microcomputer 31 to the modulation circuit 21 and is transmitted through the transmitting circuit 20 from the antenna 15 to the base station telephone. Thereafter, when a signal indicative of reception of the voltage data from the base station telephone is received by the antenna 15 and the high-frequency circuit 16, the signal is detected by the detection circuit 17 and is wave-shaped by the data processing circuit 30 to be supplied to the microcomputer 31. The microcomputer 31 stops supplying the voltage data to the modulation circuit 21 in response to the signal, so that the signal including the voltage data is no longer transmitted from the antenna 15.

Figure 3:
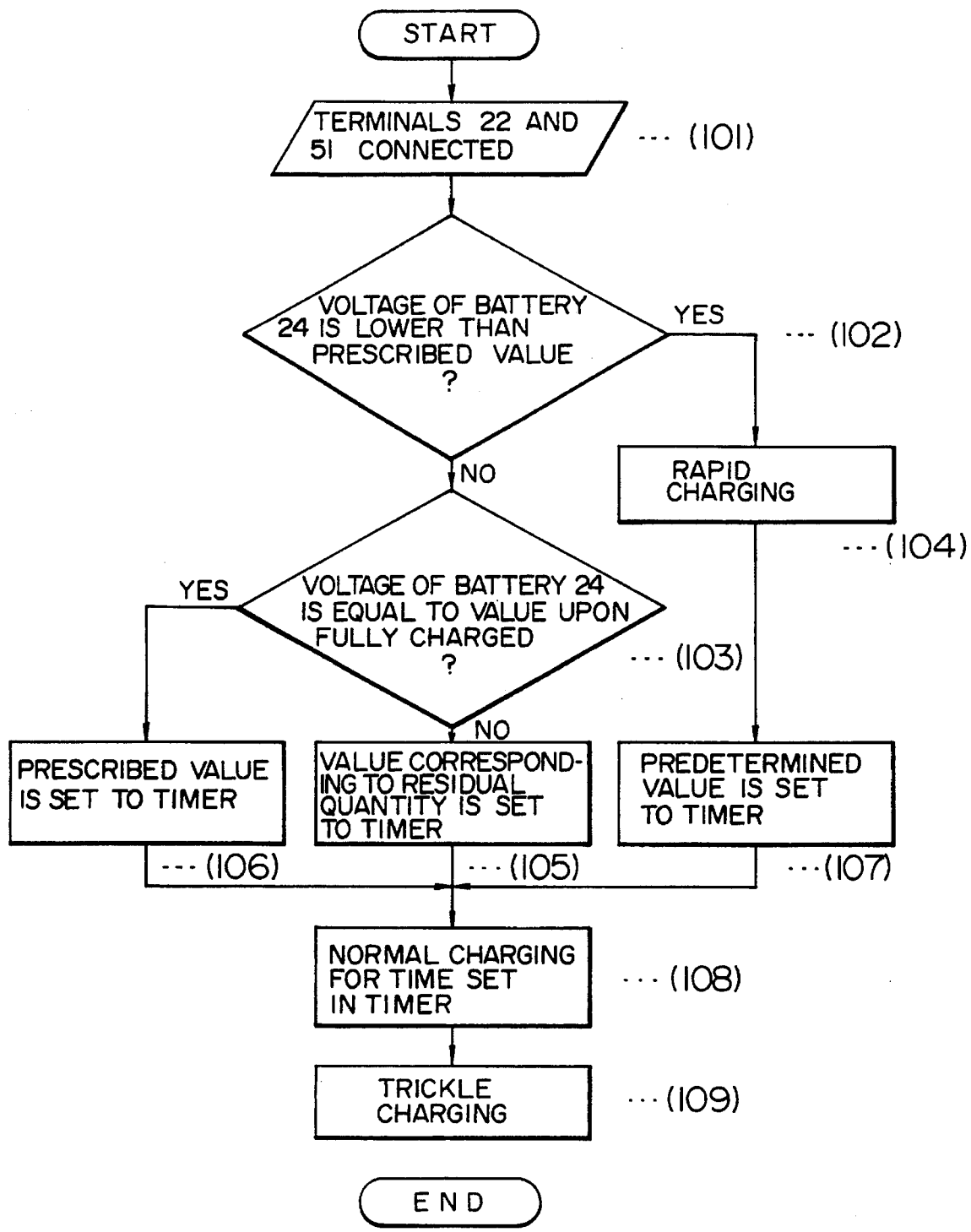
FIG. 3 is a flow chart showing a charging procedure of the charging apparatus of the embodiment.
Figure 5:
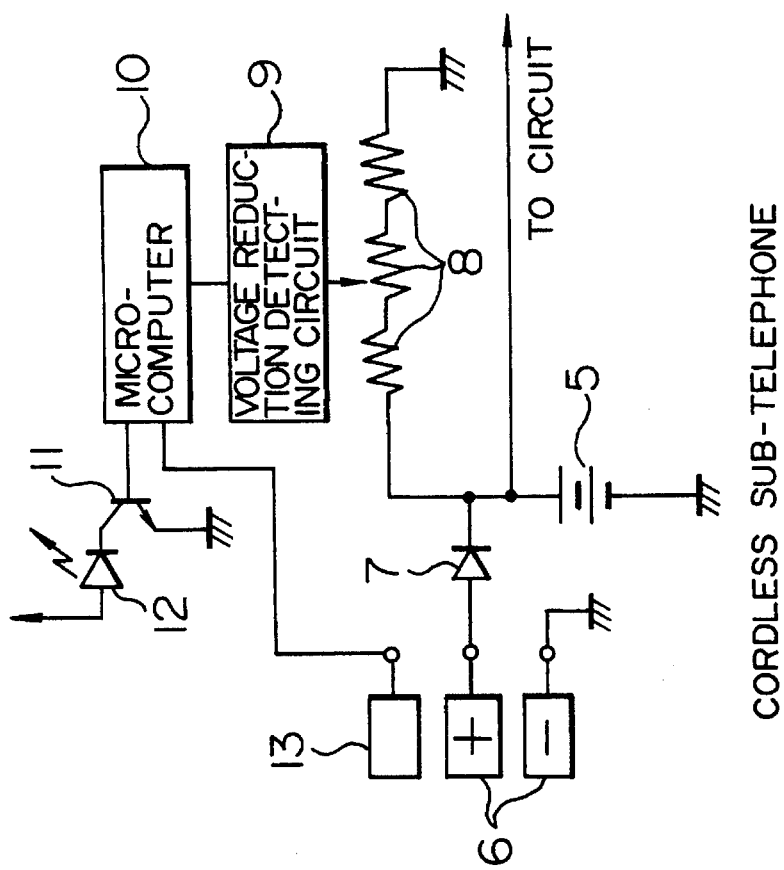
FIG. 5 is a block diagram schematically illustrating a charging unit of a cordless sub-telephone of a cordless telephone system including a secondary battery to be charged by the charging apparatus.
Figure 4:
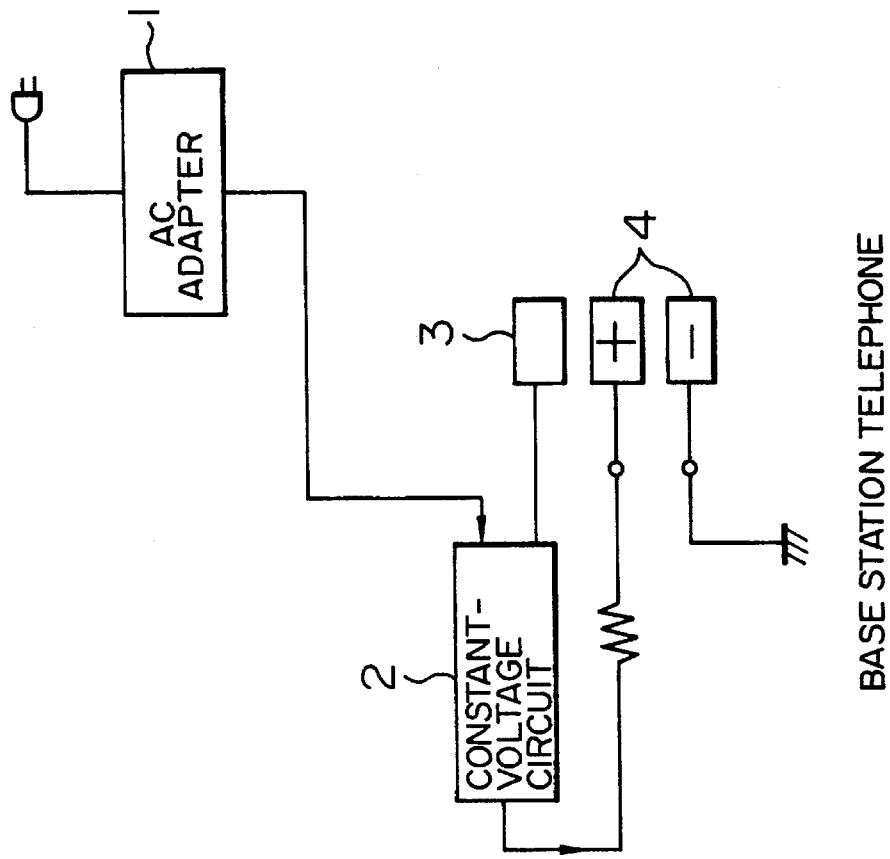
FIG. 4 is a block diagram schematically illustrating a charging unit of a base station telephone of a cordless telephone system including a conventional charging apparatus.

Operation of the base station telephone is now described with reference to FIGS. 2 and 3. The signal transmitted from the cordless sub-telephone is received by the antenna 41 and the high-frequency circuit 42. The signal is supplied to the detection circuit 43, which extracts the voltage data from the signal. The voltage data is supplied to the data processing circuit 64 in which the voltage data is wave-shaped and supplied to the microcomputer 63. The microcomputer 63 stores the voltage data and supplies a signal indicative of reception of the voltage data to the modulation circuit 47. The signal is modulated by the modulation circuit 47 and transmitted by the transmitting circuit 48 from the antenna 41 to the cordless sub-telephone. Then, when the charging detection circuit 52 detects the connection of the secondary battery 24 (step 101), the detection output of the charging detection circuit 52 is supplied to the microcomputer 63. When the microcomputer judges from the voltage data received from the cordless sub-telephone that the voltage of the secondary battery is lower than the prescribed voltage half of the fully charged voltage) (step 102), the microcomputer turns on the drive portion 54. Thus, the transistor 55 is turned on, so that a current flows from the constant-voltage circuit 50 through the resistor 56 to the secondary battery 24 and a rapidly charging current is supplied to the secondary battery 24 of the cordless sub-telephone to thereby provide rapid charging for one hour (step 104). Then, the microcomputer 63 sets 10 hours in the timer circuit 65 (step 107). Further, the microcomputer turns off the drive portion 54 and turns on the drive portion 57. Thus, the transistor 58 is turned on, so that a current flows from the constant-voltage circuit 50 through the resistor 59 to the secondary battery 24 and a normal current is supplied to the secondary battery 24 of the cordless sub-telephone to thereby provide normal charging. At this time, the timer circuit 65 is started (step 108). Thereafter, when the timer circuit 65 informs microcomputer 63 that the timer 65 has reached the set time, the microcomputer 63 turns off the drive portion 57 and turns on the drive portion 60. Thus, the transistor 61 is turned on, so that a current flows from the constant-voltage circuit 50 through the resistor 62 to the secondary battery 24 and the trickle charging current is supplied to the secondary battery 24 of the cordless sub-telephone to thereby start the trickle charging (step 109). From this time, the trickle charging current continues to flow.

Further, when the microcomputer 63 judges from the voltage data received from the cordless sub-telephone that the voltage of the secondary battery is higher than the prescribed voltage (half of the fully charged voltage of the battery) (step 102) but has not reached the fully charged voltage (step 103), the microcomputer calculates a charging time required for normal charging on the basis of the voltage data received from the cordless sub-telephone with reference to a table of voltages versus charging times stored in the microcomputer and sets the calculated time to the timer circuit 65 (step 105). The microcomputer 63 turns on the drive portion 57. Accordingly, the transistor 58 is turned on, so that a current flows from the constant-voltage circuit 50 through the resistor 59 to the secondary battery 24 and the normal current is supplied to the secondary battery 24 of the cordless sub-telephone to thereby perform normal charging. At this time, the timer 65 is started (step 108). Thereafter, when the timer circuit 65 informs microcomputer 63 that the timer 65 has reached the set time, the microcomputer 63 turns off the drive portion 57 and turns on the drive portion 60. Thus, the transistor 61 is turned on, so that a current flows from the constant-voltage circuit 50 through the resistor 62 to the secondary battery 24 and the trickle charging current is supplied to the secondary battery 24 of the cordless sub-telephone to thereby start the trickle charging (step 109). From this time, the trickle charging current continues to flow.

Further, when it is judged from the voltage data received from the cordless sub-telephone that the voltage of the secondary battery 24 of the cordless sub-telephone has reached the fully charged voltage (step 103), a prescribed time (5 hours) is set in the timer circuit 65 (step 105). Then, the microcomputer 63 turns on the drive portion 57. Thus, the transistor 58 is turned on, so that a current flows from the constant-voltage circuit 50 through the resistor 59 to the secondary battery 24 and the normal current is supplied to the secondary battery 24 of the cordless sub-telephone to thereby perform normal charging. At this time, the timer circuit 65 is started (step 108). Thereafter, when the timer circuit 65 informs the microcomputer 63 that the timer 65 has reached the set time, the microcomputer 63 turns off the drive portion 57 and turns on the drive portion 60. Thus, the transistor 61 is turned on, so that a current flows from the constant-voltage circuit 50 through the resistor 62 to the secondary battery 24 and the trickle charging current is supplied to the secondary battery 24 of the cordless sub-telephone to thereby start the trickle charging (step 109). From this time, the trickle charging current continues to flow.

As described above, in this embodiment, even if it is judged from the charged voltage data transmitted that the secondary battery is fully charged when the cordless sub-telephone is placed on the base station telephone, the base station telephone performs normal charging to the secondary battery of the cordless sub-telephone for a predetermined time and then performs trickle charging thereto. Accordingly, even when the cordless sub-telephone is separated from the base station telephone and immediately placed on the base station telephone, the secondary battery can be fully charged and the system can prevent the utilization time of the cordless sub-telephone from being shortened substantially. Further, normal charging is continuously made even if the secondary battery is fully charged, while the life of the secondary battery 24 is not shortened due to the overcharge since the charging time is at most five hours.

In addition, as in the above embodiment, when the voltage of the secondary battery is lower than the prescribed voltage, rapid charging is performed for a predetermined time and normal charging is then performed to thereby be able to provide rapid and exact charging.

I claim:

1. An apparatus for charging a battery of a cordless sub-telephone set, said apparatus comprising:

charging means for selectively charging said battery in one of (i) a normal charging mode wherein charging current flows to said battery to increase a charge quantity of said battery and (ii) a trickle charging mode wherein charging current flows to said battery to maintain said charge quantity of said battery at a predetermined value;

determining means for determining said charge quantity of said battery; and control means, operatively associated with said charging means and said determining means, for controlling said charging means, in response to said determination by said determining means, to operate in said normal charging mode for a particular amount of time and thereafter operate in said trickle charging mode, wherein:

said cordless sub-telephone includes a transmitting unit which transmits the charge quantity of said battery, and said apparatus further comprises a receiving means for receiving and supplying said transmitted charge quantity to said determining means.

2. An apparatus according to claim 1, wherein said control means sets said particular amount of time in response to said determination by said determining means.

3. An apparatus according to claim 1, wherein:

said charging means selectively operates to charge said battery in one of (i) said normal charging mode, (ii) said trickle charging mode, and (iii) a rapidly charging mode wherein charging current flows to said battery to increase said charge quantity of said battery at a faster rate than during said normal charging mode; and said control means comprises means for determining whether said charge quantity determined by said determining means is less than a threshold and controlling said charging means to operate in said rapidly charging mode for a predetermined amount of time if said charge quantity is less than said threshold and thereafter to operate in said normal charging mode for said particular amount of time.

4. An apparatus according to claim 3, wherein after expiration of said particular amount of time, said control means controls said charging means to operate in said trickle charging mode.

5. An apparatus according to claim 3, wherein said control means sets said particular amount of time in response to said determination by said determining means.

6. An apparatus according to claim 4, wherein said control means sets said particular amount of time in response to said determination by said determining means.

* * * * *